US009747625B2

United States Patent
Travis

(10) Patent No.: US 9,747,625 B2
(45) Date of Patent: Aug. 29, 2017

(54) DEVICE FOR ADDING ENHANCERS TO PET FOOD AND METHOD OF USING SAME

(71) Applicant: Dean Travis, El Paso, TX (US)

(72) Inventor: Dean Travis, El Paso, TX (US)

(*) Notice: Subject to any disclaimer, the term of this patent is extended or adjusted under 35 U.S.C. 154(b) by 0 days.

(21) Appl. No.: 14/120,029

(22) Filed: Apr. 16, 2014

(65) Prior Publication Data

US 2016/0042421 A1 Feb. 11, 2016

(51) Int. Cl.
| | | |
|---|---|---|
| *A23K 30/00* | (2016.01) | |
| *G06Q 30/06* | (2012.01) | |
| *A23K 50/45* | (2016.01) | |
| *A23N 17/00* | (2006.01) | |
| *A23K 40/30* | (2016.01) | |
| *A23K 20/174* | (2016.01) | |
| *A23K 20/147* | (2016.01) | |
| *A23K 20/158* | (2016.01) | |
| *A23K 20/163* | (2016.01) | |
| *A23K 50/42* | (2016.01) | |

(52) U.S. Cl.
CPC ....... *G06Q 30/0621* (2013.01); *A23K 20/147* (2016.05); *A23K 20/158* (2016.05); *A23K 20/163* (2016.05); *A23K 20/174* (2016.05); *A23K 30/00* (2016.05); *A23K 40/30* (2016.05); *A23K 50/42* (2016.05); *A23K 50/45* (2016.05); *A23N 17/007* (2013.01)

(58) Field of Classification Search
None
See application file for complete search history.

(56) References Cited

U.S. PATENT DOCUMENTS

| | | | | |
|---|---|---|---|---|
| 4,804,549 | A * | 2/1989 | Howley | A23K 50/40 426/602 |
| 5,057,333 | A * | 10/1991 | Lawson | A23K 50/40 426/480 |
| 5,759,599 | A * | 6/1998 | Wampler | A21D 13/08 426/241 |
| 6,274,190 | B1 | 8/2001 | Long | |
| 7,703,411 | B1 | 4/2010 | Bakos | |
| 8,647,690 | B2 | 2/2014 | Corrigan | |
| 9,295,271 | B2 * | 3/2016 | Rothamel | A23K 1/186 |
| 2004/0197465 | A1 * | 10/2004 | Clark | A23K 40/20 426/656 |
| 2005/0037108 | A1 * | 2/2005 | Lin | A23K 40/30 426/2 |
| 2005/0100651 | A1 * | 5/2005 | Pearce | A23G 3/36 426/618 |
| 2009/0068316 | A1 * | 3/2009 | Phelps | A23K 10/30 426/73 |
| 2010/0080897 | A1 | 4/2010 | Flesser | |
| 2010/0303968 | A1 * | 12/2010 | Sunvold | A23K 40/30 426/92 |

OTHER PUBLICATIONS

Pet Food Manufacture, Wendy C. Brooks, DVM, DABVP, VeterinaryPartner.com.

* cited by examiner

*Primary Examiner* — Peter L Ludwig
(74) *Attorney, Agent, or Firm* — R. Wayne Pritchard

(57) ABSTRACT

A device and method for allowing the custom mixing of liquid and dry enhancers with pet food kibbles comprising a tumbler into which the kibbles are placed; a means for adding a pre-determined amount of liquid/dry enhancers to the kibbles; a means for mixing the enhancers with the kibbles; and a means for feeding the enhanced kibbles into packages.

6 Claims, 3 Drawing Sheets

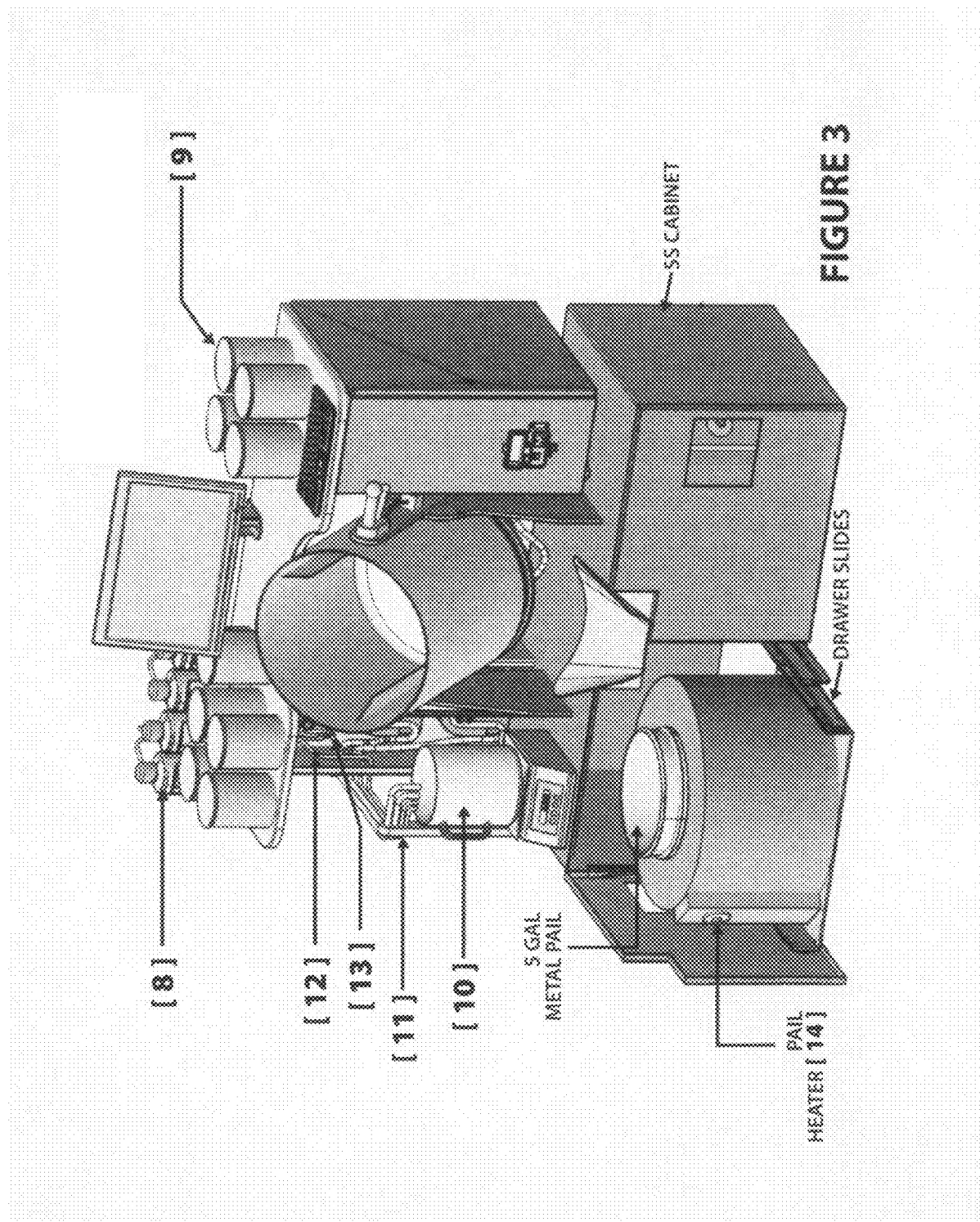

DEVICE FOR ADDING ENHANCERS TO PET FOOD AND METHOD OF USING SAME

DOMESTIC PRIORITY

This application claims the benefit of the filing date for Provisional Application No. 61/854,224, filed Apr. 19, 2013.

BACKGROUND OF THE INVENTION

Field of the Invention

This invention relates to a novel and unique method of the in store addition of vitamins and other enhancers to pet food kibbles and a device to accomplish such method.

Description of the Prior Art

Dry, cereal based pet foods became popular during World War II when tin rationing curtailed the sale of canned dog food. The manufacturing process for making cereal based dry pet food, as described in U.S. Pat. No. 8,647,690, Process for Making Pet Food, issued to Patrick Corrigan, consists of blending dry ingredients such as animal fats and meals with soy, corn or wheat grains together with vitamins and minerals, pursuant to a specific recipe, compounded, to form a dough which is then sent through an extruder. In the United States, commercial preparation of pet food exceeds 12 tons per hour and is done in such a way that each batch is nutritionally and flavor wise identical to every other batch. *Pet Food Manufacture*, Wendy C. Brooks DVM, DABVP, on line at VeterinaryPartner.com.

Within the extruder, the dry ingredients are moistened, heated and then forced through dies to form kibbles. The heat in the extrusion process destroys most, if not all, of the naturally occurring vitamins, proteins and other enhancers present in the dry ingredients. To counteract the loss in nutritional value which occurs during extrusion and sometimes to add other beneficial ingredients such as palatants (flavor) or compounds directed at specific pet needs such as fatty acids including Omega 3 Fatty Acids as well pet with flavoring, vitamins, proteins and other enhancers. It is a further object of this invention to provide a method whereby consumers can input specific nutritional needs directly to the enhancement device using electronic communications such as the Internet. Other objects and advantages of the present invention will become apparent from the following detailed description when viewed in conjunction with the accompanying drawings, which set forth certain embodiments of the invention.

BRIEF DESCRIPTION OF THE DRAWINGS

FIG. 3 illustrates the tumbler as well as the pail heater of the device of the present invention.

DESCRIPTION OF THE PREFERRED EMBODIMENTS

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as the basis for the claims and as a basis for teaching one skilled in the art how to make and/or use the invention.

Figure 1:
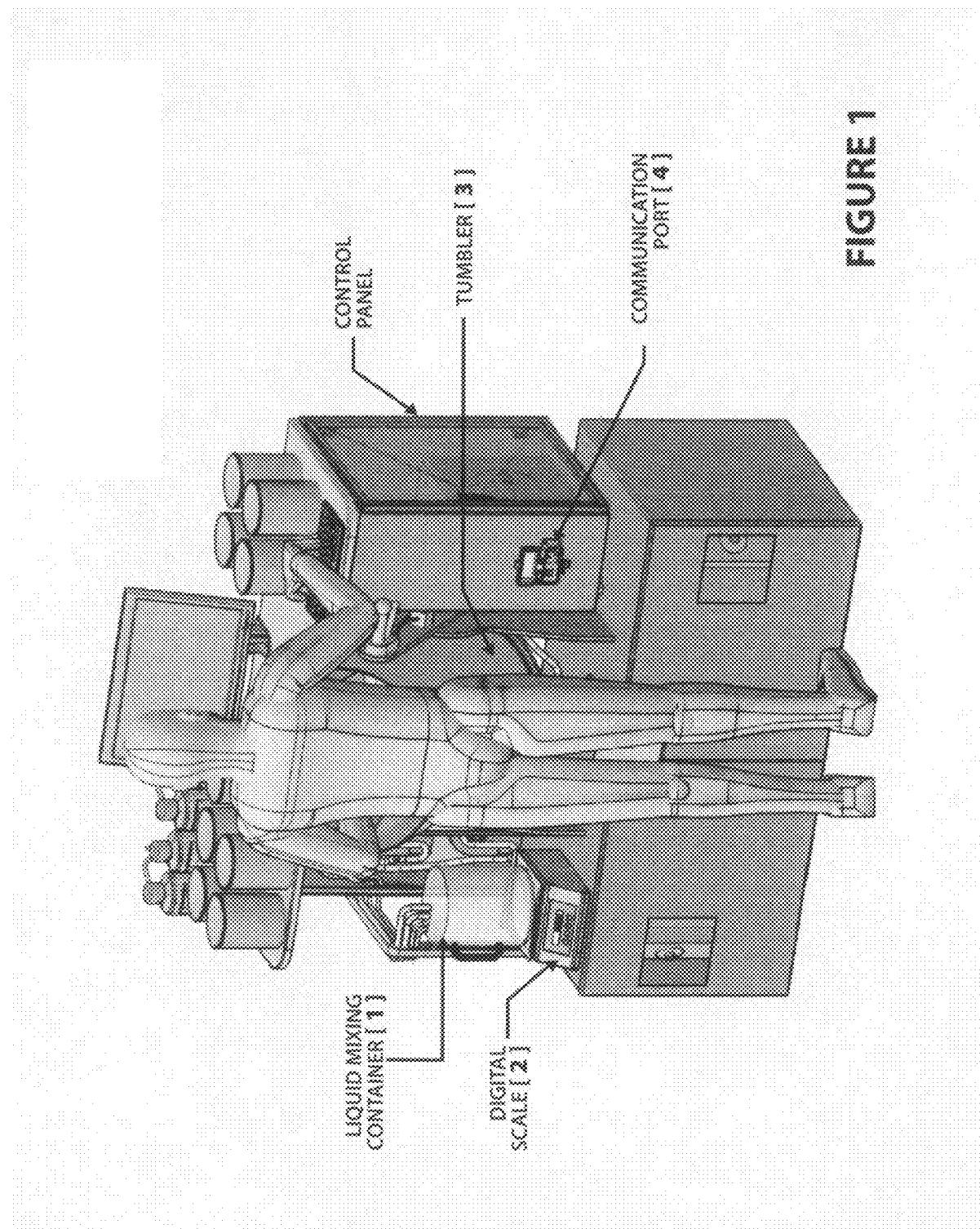
FIG. 1 is a frontal illustration of the device of the present invention depicting an operator.

The Enhancement Device of the present invention, as depicted in FIG. 1, will comprises a liquid mixing container [1], a digital scale [2], and a tumbler [3]. While FIG. 1 depicts a digital scale [2], the digital scale can be replaced with any common analog scale without effecting the efficiency of the device. Also shown in FIG. 1 is a as Glucosamine and Chondrotin directed at hip and joint inflamation; vitamins/proteins to promote growth, increase activity or decrease weight; or, Omega 6 Fatty Acids and vitamins to promote shiny coats (ingredients referred to as enhancers in this application) are injected/sprayed onto the dried kibbles following the extrusion process. For example, in U.S. Pat. No. 8,647,690 and US Patent Application Number 2010/0080897, Frederick H. Flesser, Continuous Coating of Pellets, kibbles are placed onto a vibrating conveyor belt where they are sprayed with the desired enhancers. Following the addition of the enhancers along with the required drying, the pet food is bagged and shipped to a retailer where it is place on a shelf awaiting sale.

The entire process described above takes place at a manufacturing facility, the design of which is to maximize production while simultaneously minimizing cost. What this means is that large quantities of pet food with identical nutritional profiles which meet the general needs of the largest population of pets, are produced. There is no pet food produced which is designed to meet the specific nutritional requirements of a single pet owner. Additionally, it is generally known in the food industry that fresher is better. A strawberry picked from your garden is better than one obtained from the local farmer's market which is better than one purchased from a grocery store. From the moment the pet food is produced and during the entire time the bag of pet food sits on a shelf waiting to be sold, there is a degradation in the post extrusion enhancement that took place at the manufacturer.

SUMMARY OF THE INVENTION

It is, therefore, an object of the present invention to provide a method and a device for allowing consumers to customize pet food for the specific nutritional needs of a specific communication port [4] which allows the Enhancement Device to communicate electronically with consumers through computer networks such as the Internet. The Internet consists of a large numbers of computers and computer networks which are connected through communication links. A user on the Internet can access specific web pages using that web page's URL, Uniform Resource Locator. With the Enhancement Device of the present invention, the communications port [4] will allow customers using their computer or other communications device such as smart phone (via web browser or app) to access the specific web page associated with the Enhancement Device and input identifying information of the customer along with the specific nutritional needs of the customer's pet. Contained within the Enhancement Device is a EDIS, Enhancement Device Information Storage system for storing the customer's identifying information along with the pets nutritional needs. Once the information is received by the EDIS, an order fulfillment component OFC, uses the stored information to determine the type and quantity of enhancers to be added to the kibbles.

Figure 2:
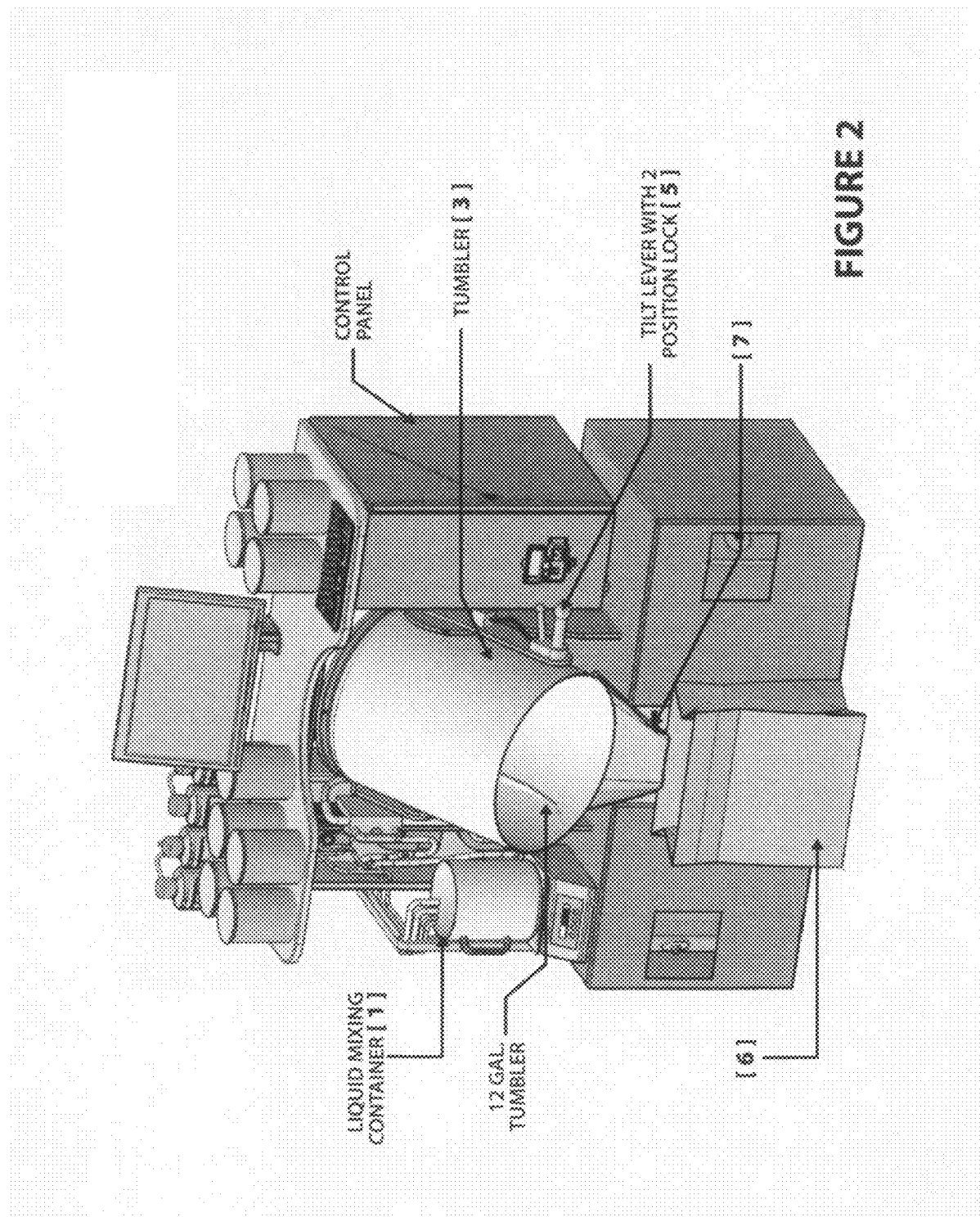
FIG. 2 is a frontal illustration of the device of the present invention without an operator being depicted.

Depicted in FIG. 2 is the tumbler [3] used to mix the kibbles with the enhancers. The tumbler [3] depicted is circular in shape and includes a means for rotating the tumbler [3] to sufficiently mix the kibbles with the desired enhancers, as well as a means for tilting the tumbler [3] once mixing has been completed. FIG. 2 illustrates the use of a tilt lever [5] which will rotate the tumbler and allow the enhanced pet food to be placed into a pet food bag [6]. Any conventional means such as an electronic motor or simple lever can be used to rotate the tumbler [3] for mixing. FIG. 2 also depicts a funnel [7] which while not necessary, helps to improve flow of enhanced pet food from the tumbler [3] into the pet food bag [6]. While FIG. 2 illustrates use of a pet food bag [6] any conventional means for storing the enhanced pet food can be used such as plastic or cardboard containers without effecting the efficiency of the Enhancement Device.

Shown in FIG. 3 are liquid [8] as well as dry [9] enhancer storage containers. Once the OFC has received the customer information, the OFC uses such information to determine the type and amount of specific dry or liquid enhancer to be used. The specific amount of liquid enhancer(s) will then be added to the liquid mixing container [10]. Any conventional method can be used to flow liquid enhancer from the liquid enhancer storage containers [8] to the liquid mixing container [10]. FIG. 4 illustrates that in the Enhancement Device of the present invention, peristaltic pumps [13] are used to flow liquid enhancer from the liquid enhancer storage container through pipes [11] and flexible hosing [12]. A peristaltic pump is a type of positive displacement pump wherein a rotor with a number of rollers, shoes, wipers or lobes are used to compress flexible tubing. As the rotor turns, the part of the tube under compression is pinched closed thus forcing the fluid to be pumped to move through the tube. Additionally, as the tube opens to its natural state, fluid flow is induced into the pump. While other conventional types of pumps can be used, a peristaltic pump is used in the Enhancement Device of the present invention because it will eliminate cross contamination of the enhancement liquid with exposed pump components typically found in other forms of positive displacement or rotary pumps. Two or more liquid enhancers can be mixed within the liquid mixing container [10] using any conventional technology such as a magnetic stirrer so long as there is no cross contamination between the mixer components and the liquid enhancers. Liquid enhancers can be maintained at room temperature or heated within the pail heater [14] shown in FIG. 3. The pail heater utilizes any common heating technology such as an electric hot plate.

The specific amount and type of dry enhancer to be used, as determined by the OFC, is measured and weighed using the digital scale [2]. The kibbles, liquid enhancer and/or dry enhancer, are then placed into the tumbler [3] and rotated for an amount of time sufficient to mix all of the ingredients. If necessary to provide sufficient coating of the kibbles, the liquid enhancers can be sprayed onto the kibbles utilizing any conventional means such as spray nozzles. The enhanced pet food is then emptied from the tumbler [3] using the funnel [7] into the pet food bag [6]. A new nutritional profile is then generated by the OFC based upon the nutritional components of the kibbles and enhancers utilized and attached to the pet food bag [6].

While the preferred embodiments have been shown and described, it will be understood that there is no intent to limit the invention by such disclosure, but rather, is intended to cover all modifications and alternate constructions falling within the spirit and scope of the invention as defined in the appended claims.

The invention claimed is:

1. A device for allowing the custom mixing of at least one liquid enhancer and at least one dry enhancer with pet food kibbles comprising:
   a communication port allowing electronic communication from consumers to an information storage system including an order fulfillment component determining the at least one liquid enhancer and/or the at least one dry enhancer to be mixed with the kibbles;
   at least one liquid enhancer storage container in which the at least one liquid enhancer is stored;
   at least one dry enhancer storage container in which the at least one dry enhancer is stored;
   a tumbler into which the kibbles are placed, the tumbler being in communication with the at least one liquid enhancer stored within the at least one liquid enhancer storage container and the at least one dry enhancer stored within the at least one dry enhance storage container;
   a means, in communication with the information storage system and under control of the order fulfillment component, for adding a pre-determined amount of the at least one liquid enhancer and the at least one dry enhancer to the kibbles;
   a means, in communication with the information storage system and under control of the order fulfillment component, for mixing the at least one liquid enhancer and the at least one dry enhancer with the kibbles in a manner creating enhanced kibbles; and
   a means for feeding the enhanced kibbles into packages.

2. The device of claim 1 further comprising a means for heating the at least one liquid enhancer.

3. The device of claim 1 further comprising two or more liquid enhancer storage containers in which the different liquid enhancer are respectively stored and a means for mixing the different liquid enhancers.

4. The device of claim 1 further comprising a means for measuring the amount of at least one liquid enhancer or the at least one dry enhancers to be added to the kibbles.

5. The device of claim 1 further comprising a means for rotating the tumbler downward to allow the kibbles mixed with the at least one liquid enhancers and the at least one dry enhancer to flow into a pet food container.

6. The device of claim 1 further comprising a means for spraying the at least one liquid enhancer onto the kibbles.

* * * * *